(12) United States Patent
Jaworski et al.

(10) Patent No.: US 7,509,542 B2
(45) Date of Patent: Mar. 24, 2009

(54) SYSTEM AND METHOD FOR TESTING THE UPSTREAM CHANNEL OF A CABLE NETWORK

(75) Inventors: Richard C. Jaworski, Alpharetta, GA (US); Robert L. Richards, Roswell, GA (US); James E. Barker, Lawrenceville, GA (US); Herman B. Elliott, Duluth, GA (US)

(73) Assignee: Sunrise Telecom Incorporated, San Jose, CA (US)

( * ) Notice: Subject to any disclaimer, the term of this patent is extended or adjusted under 35 U.S.C. 154(b) by 509 days.

(21) Appl. No.: 11/164,247

(22) Filed: Nov. 15, 2005

(65) Prior Publication Data

US 2006/0048200 A1 Mar. 2, 2006

Related U.S. Application Data

(63) Continuation of application No. 09/704,888, filed on Nov. 1, 2000, now Pat. No. 7,010,730.

(51) Int. Cl.
*G06F 11/00* (2006.01)

(52) U.S. Cl. .................................... 714/704
(58) Field of Classification Search ................. 714/704, 714/716, 712, 746, 748, 749, 752, 753
See application file for complete search history.

(56) References Cited

U.S. PATENT DOCUMENTS

| 4,070,648 | A | | 1/1978 | Mergenthaler et al. |
| 4,347,609 | A | | 8/1982 | Fukuyama et al. |
| 4,573,154 | A | | 2/1986 | Nakata et al. |
| 5,193,093 | A | | 3/1993 | Okazaki et al. |
| 5,968,197 | A | * | 10/1999 | Doiron ........................ 714/748 |
| 6,163,861 | A | * | 12/2000 | Yoshioka et al. ............. 714/712 |
| 6,182,264 | B1 | | 1/2001 | Ott |
| 6,512,747 | B1 | * | 1/2003 | Umeuchi et al. .......... 370/310.1 |
| 6,591,396 | B1 | * | 7/2003 | Honda ......................... 714/798 |
| 6,643,818 | B1 | * | 11/2003 | Valk ............................ 714/776 |
| 7,151,754 | B1 | * | 12/2006 | Boyce et al. ................. 370/328 |

FOREIGN PATENT DOCUMENTS

| JP | 4298131 A | 10/1992 |
| JP | 8307926 A | 11/1996 |
| JP | 10224761 A | 8/1998 |
| JP | 11225161 A | 8/1999 |
| JP | 11252526 A | 9/1999 |
| WO | W/O 96/24995 | 8/1996 |
| WO | WO 97/48197 A | 12/1997 |

* cited by examiner

*Primary Examiner*—James C Kerveros
(74) *Attorney, Agent, or Firm*—Mikio Ishimaru

(57) ABSTRACT

A system and method for testing a portion of a cable network provides a pattern generator, addresser, forward error corrector, and comparator. The system and method is particularly adapted to testing the upstream channel in a cable network. The pattern generator generates a test signal. The addresser addresses the signal to a known server and also instructs the known server to return the test signal to the test system. The forward error corrector corrects errors introduced in the test signal in transmission from the known server to the test system. The comparator then compares the returned test signal to the originally transmitted test signal to determine the performance of the back channel. Preferably, the comparator uses a bit error rate test to determine the performance of the back channel.

31 Claims, 8 Drawing Sheets

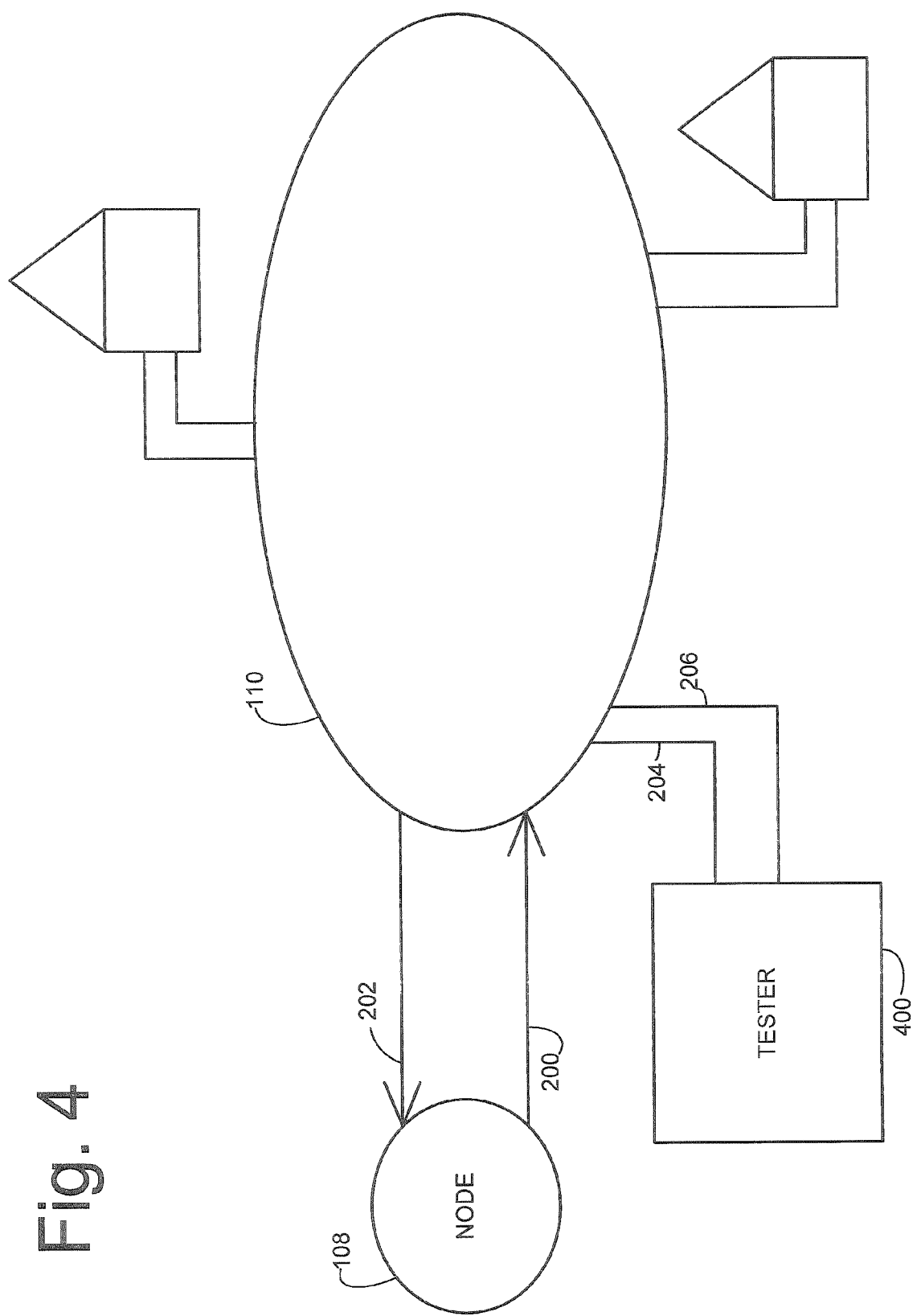

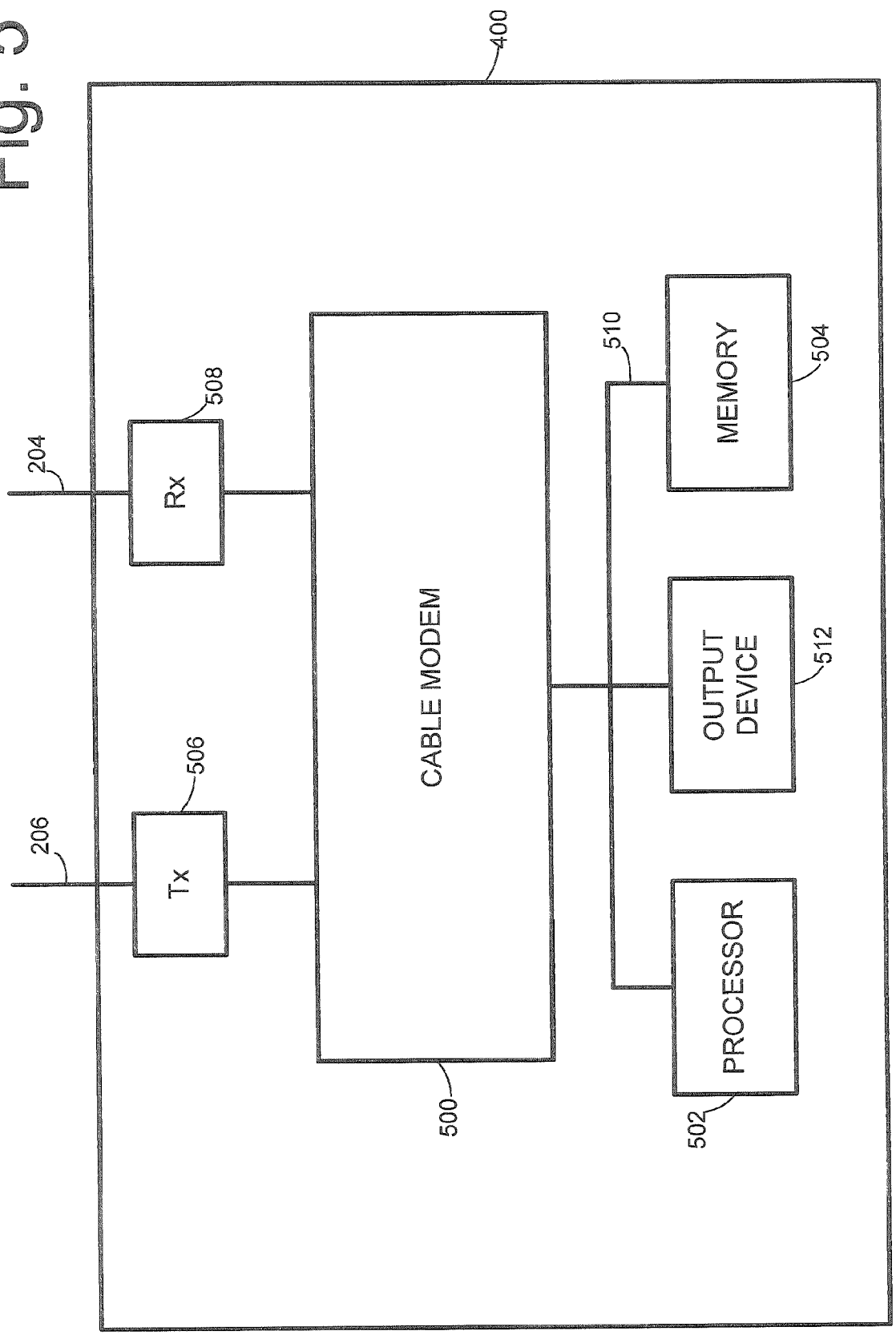

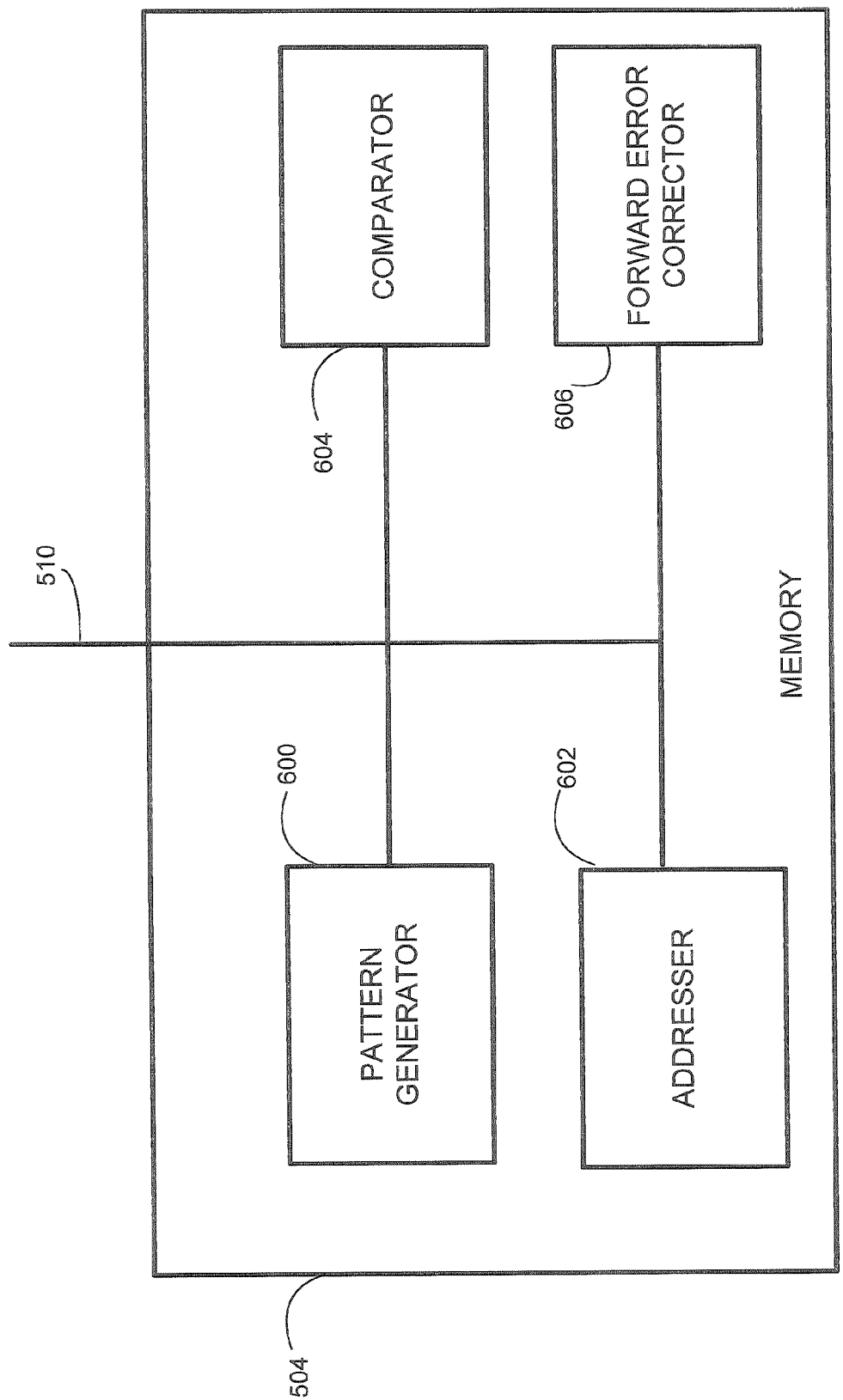

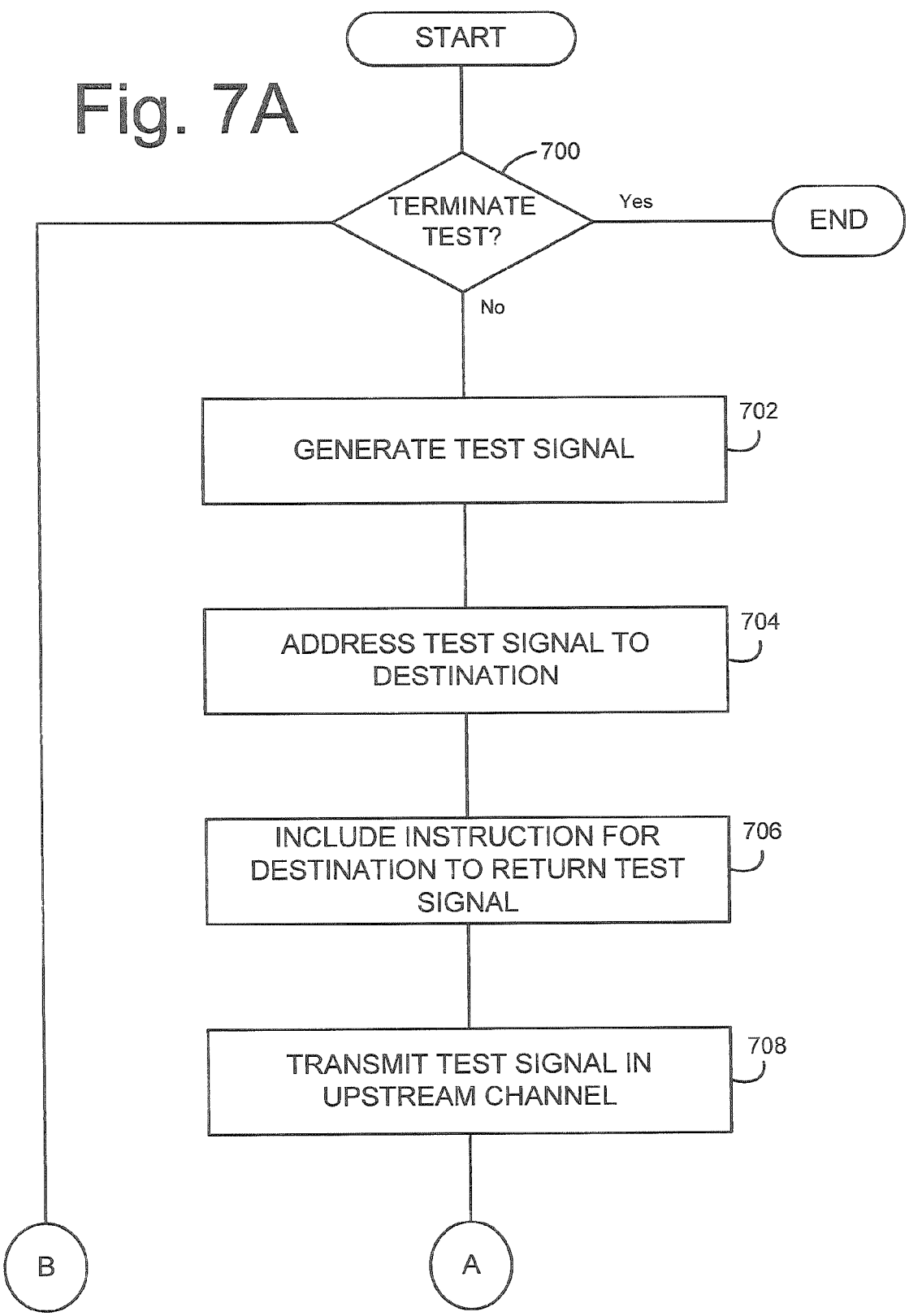

SYSTEM AND METHOD FOR TESTING THE UPSTREAM CHANNEL OF A CABLE NETWORK

This is a continuation of U.S. patent application Ser. No. 09/704,888, filed Nov. 1, 2000, now U.S. Pat. No. 7,010,730 B1."

FIELD OF THE INVENTION

The present invention relates generally to a system and method for testing the upstream channel transmission facility in a cable network. More specifically, the present invention provides for bit error rate testing of the upstream channel of a cable network.

BACKGROUND OF THE INVENTION

Originally cable networks were established to transmit television signals to homes and offices. Cable networks provide advantages over transmission television networks that include a clearer signal and a greater selection of channels. These cable networks originally were intended simply to provide customers with television signals. Therefore, they did not provide customers a means to transmit signals to the cable network operator, to other customers, or to any other party.

In early embodiments, cable networks transmitted analog signals. More recently, cable networks have been converted to transmit digital signals. With digital cable networks, customers may transmit signals back to the cable network operator. This facility has been called the upstream channel in contrast to the forward or downstream channel that delivers programming to the customer. Additionally, digital cable networks may now be coupled to the Internet thereby providing houses and offices access to the Internet. This access is generally faster than access provided by other technologies.

FIG. 1 shows a typical digital cable network. A cable modem termination system ("CMTS") 100 is the base component of the system. The CMTS 100 is a typical system well known in the art and typically includes facilities for forward error correction. The CMTS 100 is coupled to the Internet backbone 102. The Internet backbone 102 carries Internet traffic, is well known in the art, and typically comprises fiber optic communication lines. Alternatively, the Internet backbone 102 may comprise co-axial cables. CMTS 100 is also coupled to a combiner/splitter 116. Combiner/splitter 116 combines signals from CMTS 100 and from fiber optic lines 104. Fiber optic lines 104 carry television signals. Fiber optic lines 104 may alternatively be co-axial cables. Combiner/splitter 116 is well known in the art. Combiner/splitter 116 combines signals from the Internet backbone 102 and the incoming television signals from fiber optic lines 104 and outputs a resulting signal on a fiber optic transmission line 106. Combiner/splitter 116 also receives signals from fiber optic transmission line 106 and splits off the appropriate signals for transmission to the Internet backbone 102 or for use by the cable network operator. Fiber optic transmission line 106 is a standard cable network transmission line comprising fiber optics and related equipment.

Fiber optic transmission line 106 is coupled to one or more nodes 108. In an alternative embodiment, a co-axial cable couples combiner/splitter 116 to nodes 108. Nodes 108 serve as distribution points for the cable network receiving signals from the CMTS 100 transmitted on the fiber optic transmission line 106. Each node 108 is coupled to a local area cable loop ("LACL") 110. LACL 110 is typically a co-axial cable that carries signals from the node to homes and businesses within in a relatively close geographical area. Alternatively, LACL 110 may be a fiber optic cable. LACL 110 forms a loop with its beginning and end coupled to node 108. Node 108 retransmits signals received from combiner/splitter 116 on its associated LACL 110. In alternate embodiments, LACL 110 may be coupled directly to combiner/splitter 116. Those of ordinary skill in the art will recognize that a network may have many different structures.

Coupled to each LACL 110 are one or more customer sites 112. A customer site may be either a home or office and is coupled to LACL 110 by a co-axial cable 114 that taps off of LACL 110.

FIG. 2 shows the coupling of LACL 110 to a plurality of customer sites 112 and to node 108. Node 108 has two couplings to LACL 110, 200 and 202 respectively. Couplings 200 and 202 are logical couplings; in actuality, a single fiber optic transmission line or co-axial cable couples node 108 to LACL 110. FIG. 2 also shows a customer site in more detail. Corresponding to couplings 200 and 202 are couplings 204 and 206. Couplings 204 and 206 are logical representations of the coupling between customer site 112 and LACL 110. In actuality, the coupling between customer site 112 and LACL 110 is a coaxial cable, twisted pair, wireless, or other coupling. Coupling 204 provides a forward or downstream channel signal path from LACL 110 to customer site 112. Correspondingly, coupling 206 provides an upstream signal path from customer site 112 to LACL 110 and then to node 108 and CMTS 100.

Customer site 112 comprises a combiner/splitter 214, a cable modem 208 and at least one computer 210 and at least one television 212. Computer 210 is well known in the art and is equipped with a browser for transmitting to and receiving information from the Internet. Computer 210 is coupled to cable modem 208. Cable modem 208 is a conventional cable modem. Cable modem 208 is coupled to combiner/splitter 214 which is a conventional device for combining and splitting digital signals. Combiner/splitter 214 is similar to combiner/splitter 116 but on a scale appropriate for a customer site. Those of ordinary skill in the art will recognize combiner/splitter 214. Television 212 is also coupled to combiner/splitter 214.

Coupling 200 provides a forward channel signal path from node 108, through LACL 110, through coupling 204, and to the customer site 112. In the forward channel, the node transmits digital signals at frequencies between 88 and 860 MHz. Typically, the forward channel provides forward error correction whereby cable modem 208 is capable of detecting errors in the signal it receives from node 108. Having detected errors in the signal, cable modem 208 then corrects the errors. The methods and means for correcting signals received by a cable modem are well known in the art.

Coupling 202 provides a signal path for customer sites 112 to communicate with the cable network operator. Cable modem 208 transmits through coupling 206, through LACL 110, and through coupling 202 in the reverse direction of the forward channel through coupling 202. This upstream channel is generally limited to frequencies between 5 and 50 MHz. Historically, the cable network operators used the upstream channel to provide a signal path from customer sites 112 to the cable network operator. For example, a customer site may request specific programming, sometimes known as pay per view. A customer site may also use the upstream channel to send other requests to the cable network operator such as billing inquiries, notices of service deficiencies, and other information.

FIG. 3A illustrates the form of a signal 300 in the forward channel from combiner/splitter 116 to a customer site. The forward channel signal is the result of time multiplexing more than one serial signal. FIG. 3A shows three exemplary signals 302 that are time multiplexed into a down stream signal 300. The forward channel signal is framed with each frame lead by a header 304. The header 304 indicates the beginning of the frame and the remaining bits of the frame are the payload. The signal to each customer site is time multiplexed with the signals intended for every other customer site on the LACL and loaded into the payload of the frame. The cable modem at each customer site monitors the forward channel signal and picks off the bits in the payload of each frame that are intended for the specific cable modem. The cable modem then reconstructs the signal intended for the customer site. There are many methods of time multiplexing signals; those of ordinary skill in the art will recognize these methods.

The upstream channel is typically not framed. FIG. 3B illustrates the form of an upstream channel signal 306 that comprises packets transmitted in a token ring type protocol. When a cable modem first couples to a LACL, it receives a schedule from the CMTS. This schedule designates when the cable modem may transmit in the upstream channel. When the schedule indicates that the cable modem may transmit in the upstream channel, the cable modem composes a packet and transmits it in the reverse direction of the forward stream to the CMTS.

A packet comprises a packed identifier ("PID") 308 and a payload 310. The PID 308 specifies the cable modem that transmitted the packet, specifies the destination of the packet, and may include other information. The payload 310 of the packet comprises entirely data from the transmitting cable modem. Unlike the forward channel signal, upstream channel packets are typically not multiplexed with signals from other cable modems; the entire packet payload comprises data from a single cable modem.

As mentioned above, the upstream channel was originally intended to be used for sending requests to the cable network operator and has generally not provided high transmission performance. A customer site, however, would typically transmit infrequently and then would transmit only small amounts of data. The upstream channel, therefore, was generally not crowded and performance was not a priority.

More recently, cable network operators have coupled CMTSs to the Internet backbone to provide customer sites with Internet access. Generally, such systems have offered advantages over other technologies for coupling customer sites to the Internet. The forward channel has a large bandwidth that allows for fast downloads of data to customer sites. Additionally, cable systems are already in place; removing the necessity of large capital investment. At first, the limited performance of the upstream channel was not an impediment to using cable systems for Internet access. Generally, Internet traffic from a customer site to the Internet backbone required much less bandwidth than the forward stream required. Customer sites would make requests to web sites for data. The requests, being small, would not require broad bandwidth. The requested data, however, would frequently be large and require the broad bandwidth of the forward channel. The poor performance of the upstream channel was not relevant to the use of cable systems for Internet access. If a signal from a customer site never reached its destination, the customer site simply sent the signal again. The size of signals and their number did not noticeably impede Internet access.

More recently, however, the limited performance of the upstream channel is impeding Internet access. Customer sites are transmitting more data in the upstream channel. Some customer sites now are themselves web sites or are uploading large amounts of information to the Internet. Thus, the amount of data transmitted in the upstream channel has increased. Additionally, there are more customer sites accessing the Internet; correspondingly there is more traffic in the upstream channel. The greater number of customer sites means fewer transmission slots for any one customer site; should a signal need to be retransmitted, there will be a delay until another transmission slot is available. Also, the increased size of the signals makes them more burdensome to resend. No longer is it acceptable simply to resend a signal that fails to reach its destination. In order to utilize fully the capabilities of a cable network, impairments that result in retransmission of packets in the upstream channel must be diagnosed and repaired.

It has become imperative to improve the performance of the upstream channel in cable networks. With the need to improve upstream channel performance, there is a corresponding need to test the upstream channel. Testers are needed to determine when and where the upstream channel is limiting network performance. The upstream channel is difficult to test. At this time, when a customer site is experiencing inadequate Internet access, a test set must be used at the customer site and simultaneously, a test set must be used at the CMTS, the node, or other location. The need to coordinate multiple test sets makes testing the upstream channel difficult. In addition, disabling the network while testing is not practical. There is a need for devices and methods to test accurately and efficiently the upstream channel of cable networks without disabling the network while testing.

SUMMARY OF THE INVENTION

It is an objective of the present invention to provide a system and method for testing the upstream channel of a cable network. It is a further objective of the present invention that the system provide automatic determination of the performance of the upstream channel without disabling the network for other users during testing. Finally, it is an objective of the present invention to provide a system and method for testing the upstream channel without the need for a second coordinated test device at the CMTS location.

The present invention utilizes the forward error correction facility of cable networks to provide a novel system and method for testing the upstream channel of a cable network. In its most basic form, the present invention provides a tester that comprises a pattern generator, addresser, forward error corrector, and comparator. The pattern generator generates a signal that the tester transmits on the upstream channel. A device within the Internet backbone, selected by the addresser, receives the signal from the pattern generator and returns it to the tester. At the tester, the forward error corrector removes errors introduced in the forward channel. The comparator then compares the corrected, received signal to the signal originally transmitted. The comparator determines, through tests such as a bit error rate test, the performance of the upstream channel.

The present invention provides a device and method for testing the upstream channel that is efficient, that may be used without disabling the network, and that does not require a second, coordinated test device at the CMTS location.

BRIEF DESCRIPTION OF THE DRAWINGS

FIG. 4 is a block diagram of a local area cable loop with the present invention included.

FIG. 5 is a block diagram of a tester according to the present invention.

FIG. 6 is a block diagram of the memory of a tester according to the present invention.

FIGS. 7A & 7B are flow charts of the method of the present invention.

DETAILED DESCRIPTION OF THE INVENTION

Figure 1:
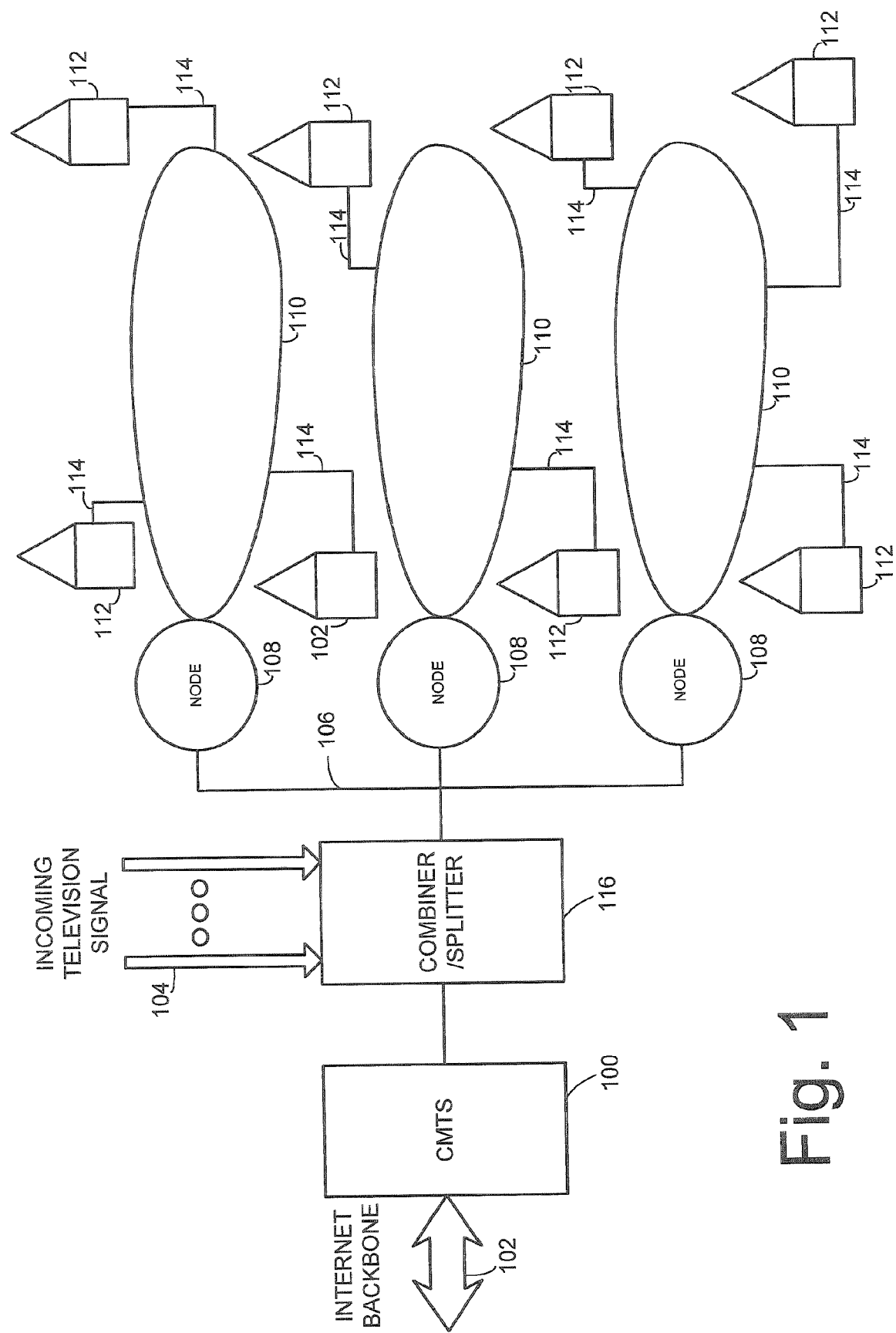
FIG. 1 is a block diagram of a conventional cable network.
Figure 2:
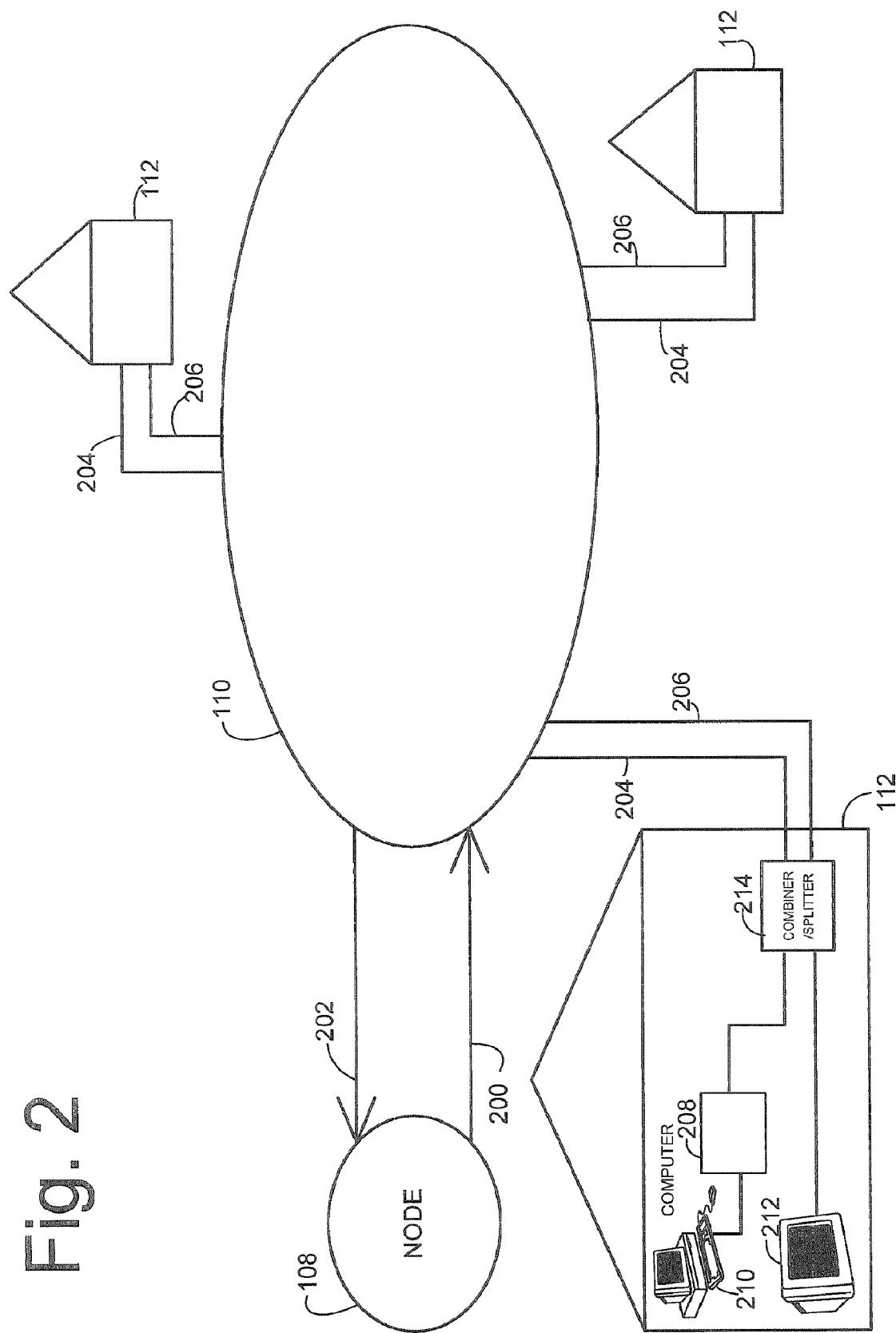
FIG. 2 is a block diagram of a local area cable loop with a detailed illustration of a customer site.
Figure 3A:
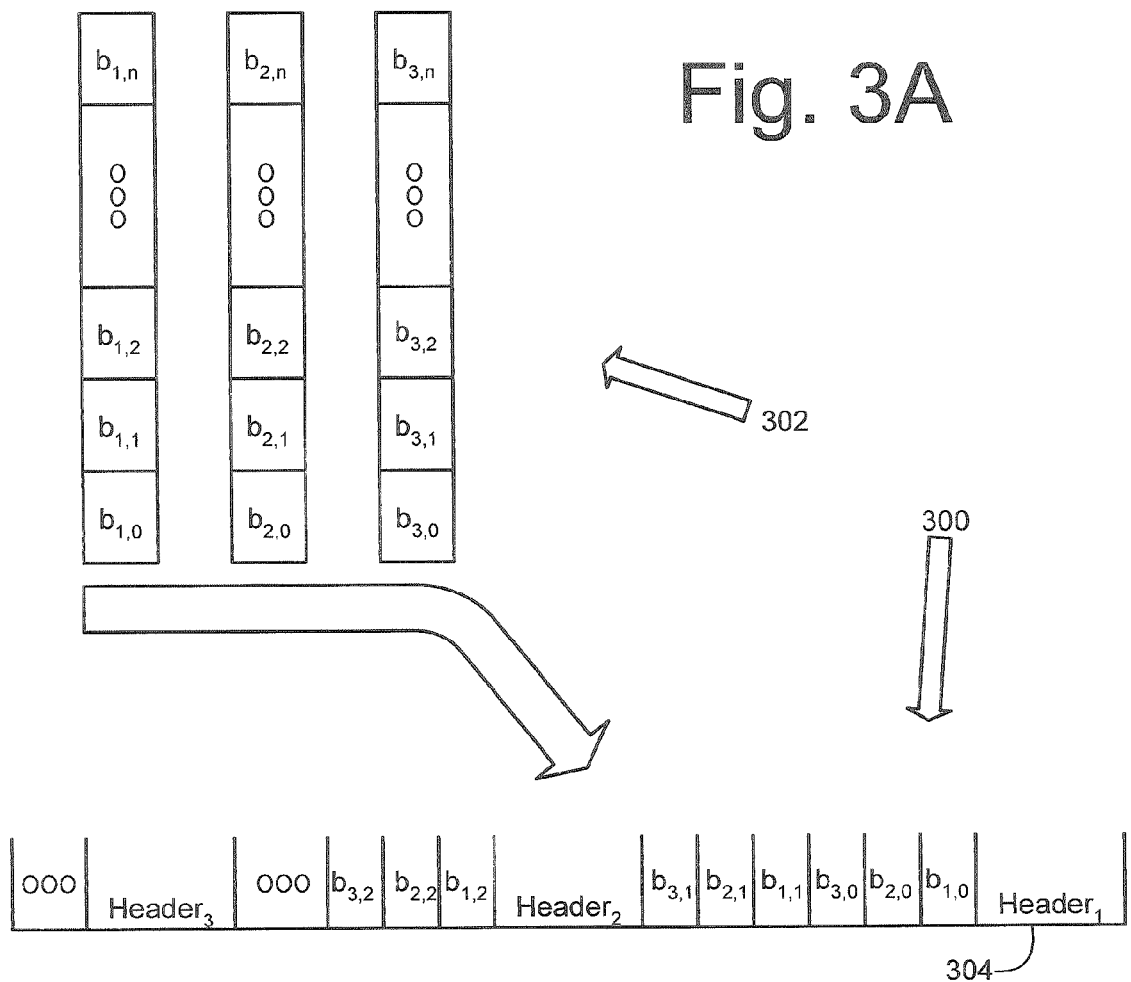
FIG. 3A is a block diagram of the form of the forward channel signal in a conventional cable network.
Figure 3B:
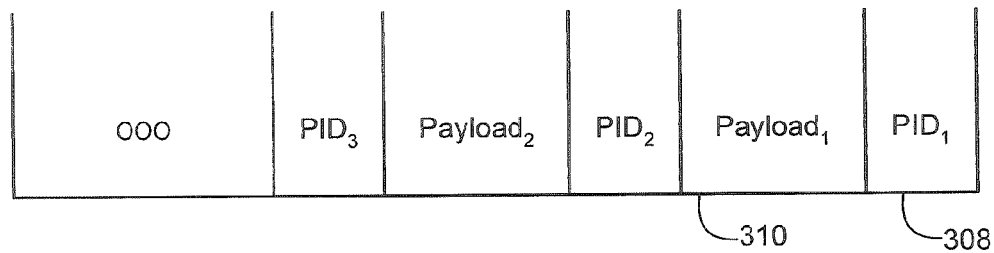
FIG. 3B is a block diagram of the form of the upstream channel signal in a conventional cable network.

Referring now to FIG. 4, a Tester 400 according to the present invention is shown coupled to LACL 110. Preferably the Tester 400 is handheld or portable making it convenient for a user to transport to a customer site. Tester 400 is coupled through logical coupling 204 so that it may receive signals from the forward channel on LACL 110. Tester 400 is also coupled through logical coupling 206 to transmit signal on the upstream channel of LACL 110. In the preferred embodiment, Tester 400 is coupled to LACL 110 by a coaxial cable or twisted pair. It is preferred that Tester 400 be coupled to LACL 110 in place of the cable modem 208 at the customer site 112. This, however, is not required. Tester 400 may be coupled to LACL 110 at any location. Tester 400 advantageously tests the upstream channel without disrupting other traffic in the upstream channel.

Referring now to FIG. 5, a detailed view of an embodiment of Tester 400 is shown. Tester 400 comprises a cable modem 500, a processor 502, a memory 504, a transmit port 506, a receive port 508, a bus 510, and an output device 512. While FIG. 5 shows an embodiment of Tester 400, those of ordinary skill in the art will recognize that Tester 400 may be embodied in field programmable gate arrays, application specific integrated circuits, and many other components.

Processor 502 is a conventional microprocessor for executing instructions in computer or an electronic device. Microprocessors are available from Intel Corporation of Santa Clara, Calif., from Motorola, Inc. of Schaumburg, Ill., or from many other manufacturers. In some cases, microprocessors are integrated, along with other circuits, into custom, commercially available application specific integrated circuits. Memory 504 is preferably a conventional static random access memory device but alternatively may be any memory device including, but not limited to, a cd-rom, a read only memory, a dynamic random access memory, a hard drive, a floppy drive, a magnetic tape, a programmable read only memory, an electronically programmable read only memory, an erasable electronically programmable read only memory, or a flash memory. Those of ordinary skill in the art will recognize that memory 504 may be any type of data storage device.

Memory 504 is uniquely programmed with instructions that, when executed by the processor 502, implement the present invention. A conventional bus 510 couples processor 502 to memory 504. Output device 512 is a conventional output device such as a computer monitor and is coupled to processor 502 and memory 504 by bus 510.

The bus 510 also couples the processor 502, output device 512, and memory 504 to cable modem 500. Cable modem 500 is a conventional cable modem for transmitting and receiving signals on a cable network. Cable modems are available from Broadcom Corporation of Irvine, Calif. Cable modem 500 both receives and transmits signals to and from the processor 502 and memory 504. Cable modem 500 is also coupled to a port 506 to transmit signals through logical coupling 206 to LACL 110. Similarly, cable modem 500 is coupled to a port 508 to receive signals, through logical coupling 204, from LACL 110.

According to the present invention, cable modem 500 may include systems for forward error correction of the forward channel signal received through port 508. Forward error correction techniques are well known in the art.

Referring now to FIG. 6, a block diagram of memory 504 is shown. Memory 504 comprises a pattern generator 600, an addresser 602, a comparator 604, and a forward error corrector 606. Those of ordinary skill in the art will realize that pattern generator 600, addresser 602, comparator 604, and forward error corrector 606 are sections of memory 504 that hold program instruction steps that when executed by the processor 502 carry out the functions of the devices. Pattern generator 600, addresser 602, comparator 604, and forward error corrector 606 are coupled to the processor 502 and cable modem 500 through bus 510. In this embodiment, forward error corrector 606 is located in memory 504; in an alternate, and preferred, embodiment, forward error corrector is located in cable modem 500.

Pattern generator 600 generates a test signal for transmission in the upstream channel of LACL 110. Preferably, pattern generator 600 generates a pseudo random test signal, but any signal will suffice. Pattern generator 600 then transmits the test signal to addresser 602 and to comparator 604. The copy of the test signal that pattern generator 600 transmits to comparator 604 serves as a standard for the tests Tester 400 conducts. Addresser 602 prepares the test signal for transmission on LACL 110. Addresser 602 loads the test signal into the payload of one or more packets for transmission in the upstream channel. Addresser 602 also prepares the PID of each packet. Included in the PID is that address of the location to which the packet is being transmitted, the destination of the packet. Preferably addresser 602 addresses the packets to CMTS 100 although addresser 602 may address the packets to other destinations. Addresser 602 also includes within the PID an instruction for the device at the destination to return the test signal to cable modem 500. Addresser 602 then provides the test signal to cable modem 500 for transmission on LACL 110.

When the CMTS 100 returns the test signal to Tester 400, Tester 400 receives the returned signal through the forward channel and through cable modem 500, which then passes the test signal to forward error corrector 606. Forward error corrector 606 uses conventional techniques to remove errors from the test signal introduced in the test signal during transmission in the forward channel from CMTS 100. Forward error corrector 606 then passes the corrected test signal to comparator 604.

Comparator 604 first eliminates the PIDs so that only the test signal in the payload remains. Comparator 604 then compares the corrected test signal to the original test signal received from pattern generator 600. One of the techniques comparator 604 uses is the bit error rate test. The bit error rate test is the quotient of the number of errors in a signal divided by the number of bits in the original signal. Here, the bit error rate test is determined by dividing the number of errors in the corrected signal by the number of bits in the original test signal. Comparator 604 determines the number of errors by comparing the original signal from pattern generator 600, which serves as a standard, to the corrected signal from forward error corrector 606. Deviations between the original signal from pattern generator 600 and the corrected signal from forward error corrector 606 are errors.

Having determined the bit error rate, comparator 604 transmits a signal to output device 512, shown in FIG. 5. Output device 512 then outputs the result of the test. Those of ordinary skill in the art will recognize that comparator 604 may execute many other tests on the corrected test signal in addition to the bit error rate test.

In an alternate embodiment, comparator 604 uses a block error rate test. The block error rate test is the quotient of the number of packets that reach CMTS 100 with errors divided by the number of packets addresser 602 transmits. In this alternate, and less preferred embodiment, when the addresser 602 addresses a packet, it includes an index in the PID. The index indicates where in the sequence of packets that comprise the test signal the particular packet exists. For example, for the first packet of the test, the addresser 602 would insert the index 1 in the PID. For the second packet, the addresser 602 would insert 2, and so on. In the block error rate test, the CMTS 100 uses forward error correction techniques to detect if any errors have been introduced into the packets that it receives from the addresser 602. If an error has occurred in a packet, the CMTS 100 discards the packet. If no error has occurred in the packet, the CMTS 100 transmits it back to the Tester 400. Comparator 604 determines the number of packets in which errors occurred in the upstream channel using the indices in the PID of the returned packets. The comparator 604 then determines the block error rate which is the quotient of the number of discarded packets divided by the number of packets transmitted. In this alternate embodiment, the forward error corrector 606 is not necessary except to correct errors, which occurred in the forward channel, in the index.

The preferred embodiment of the system of the present invention is as incorporated in a cable modem application specific integrated circuit ("ASIC") from Broadcom Corporation of Irvine, Calif. Broadcom provides ASICs with basic cable modem functionality along with means to program the ASIC with additional functionality. It is preferred that a programmable Broadcom cable modem ASIC be programmed to include pattern generator 600, addresser 602, comparator 604, and forward error corrector 606.

Figure 7B:
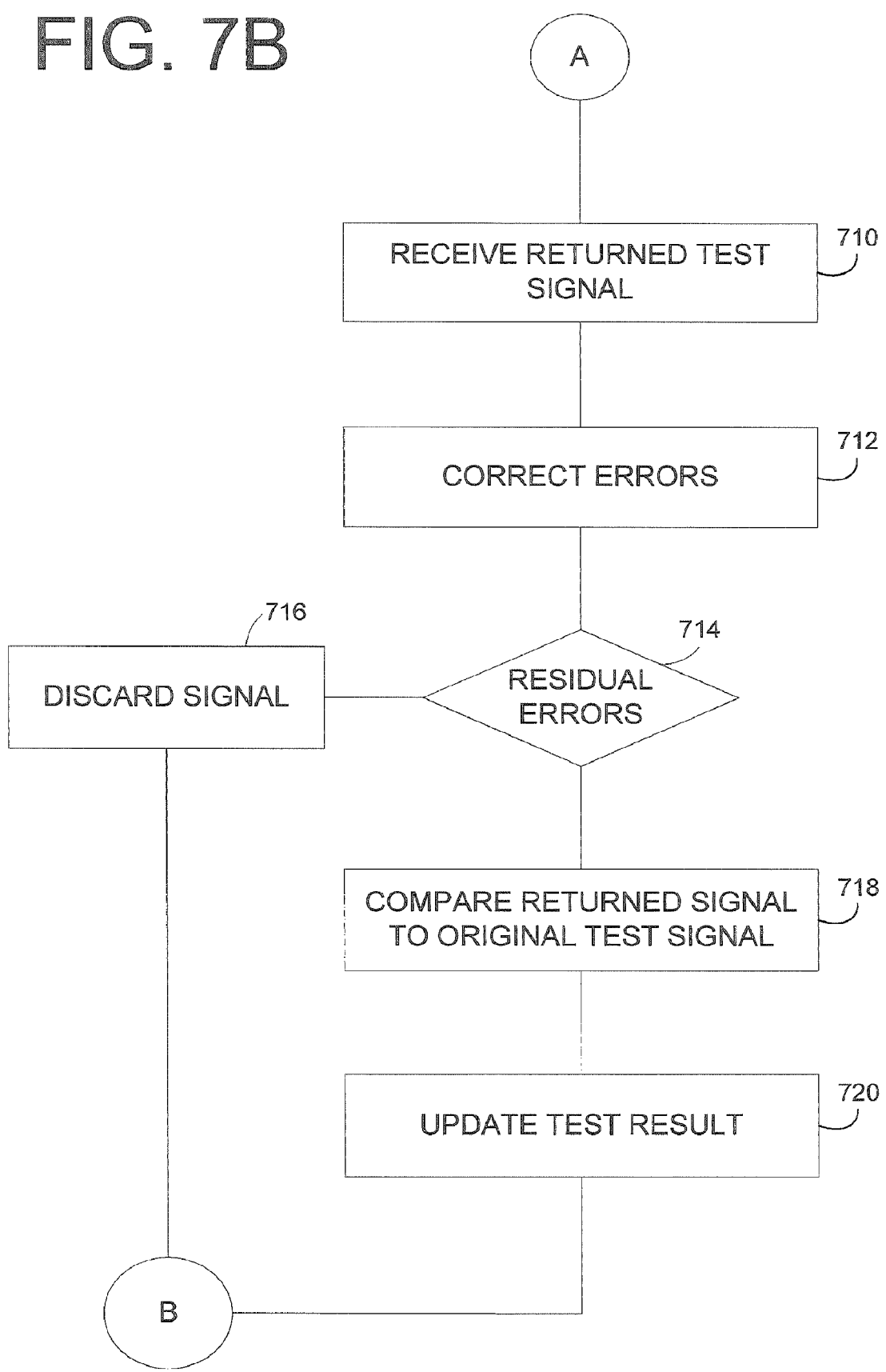

FIGS. 7A & 7B illustrate a flow chart of the preferred method for testing the upstream channel of a LACL. The preferred method begins at step 700 where the method determines if the user has indicated that the test is to terminate. The preferred method runs continuously until stopped by an operator. As explained below, the longer the method runs the more accurate will be its result. If, in step 700, the method had received a signal to terminate the test, the method ends. Otherwise, in step 702, the method generates a test signal. The test signal is preferably of sufficient length to fill the payload of the largest packet that is available for the local area cable loop to be tested. In step 704, the method prepares the PID of the packet or packets containing the test signal. Preparing the PID includes addressing the packet or packets to a destination server. Preferably the destination server is the CMTS although it may be another server. In step 706, the PID is also set to instruct the destination server to return the packet. Each packet that contains the test signal has a similarly prepared PID.

The method in step 708 transmits the packets in the upstream channel of the LACL. In step 710, the packets are returned to their source in the forward stream of the local area cable loop. Errors introduced into the signal as it was transmitted in the forward channel from the CMTS are corrected in step 712. The methods of forward error correction of signals in the forward channel are well known in the art. Those of ordinary skill in the art will recognize that forward error correction techniques are only capable of correcting errors to a point. If the number of errors exceeds a threshold number, the forward error correction technique cannot correct all the errors. The technique can, however, determine if residual errors, errors that were not corrected, are present. Additionally, the forward error correction techniques can only correct errors introduced in the forward stream from the CMTS to the tester. It is preferable to correct all errors introduced into the signal that were not introduced in the upstream channel. For these reasons, it is preferable in step 704 to address the test signal to the CMTS. All errors not occurring in the upstream channel will thereby be corrected or otherwise eliminated as described below.

In step 714, the method determines if any residual errors are present in the corrected signal. If there are residual errors, the method discards the portion of the signal that contains the residual errors in step 716 and returns to step 700. In an alternate embodiment, the method does not discard the portion of the signal containing errors; the alternate method simply accepts the inaccuracy. In yet another alternate embodiment, it is possible to correct for the residual errors. If the number of residual errors is regular, the method may identify the regularity and adjust the result determined in step 718, described below, accordingly.

If in step 714 no residual errors are present, the preferred method, in step 718, compares the returned test signal to the originally generated test signal which serves as a standard. From the comparison it is possible to measure the performance of the upstream channel because all errors in the signal occurred in the upstream channel. Any errors that occurred in the forward channel were either corrected in step 712 or were discarded in step 716.

The preferred test for determining the performance of the upstream channel is a bit error rate test. The bit error rate test is the quotient of the number of errors in the signal divided by the number of bits in the signal. The number of errors is determined by comparing the corrected signal to the standard. Deviations between the corrected signal and the standard are errors. Preferably the bit error rate test is determined using all errors detected and all bits transmitted from the beginning of the test.

An alternate test at step 718 is the block error rate test. For this alternate, and less preferred test, in step 704 the method includes an index with the packet. The index indicates how many packets, as of that time, the method has transmitted in the upstream channel. For example, the first packet has index 1, the second packet has index 2, et cetera. In this alternate method, the destination CMTS discards packets in which errors occurred in the upstream channel. The CMTS returns packets without errors. Upon receipt of the returned packets, the method need not correct errors, although if an error occurred in the index, the method may use forward error correction to correct the index. The method uses the indices to determine how many packets the CMTS has discarded. For example, if a packet returns with index 100 and the next packet to return has index 111, then the method determines that the CMTS discarded 10 packets. The block error rate is the quotient of the number of packets discarded divided by the number of packets transmitted. For the block error test, the method preferably transmits packets that are as small as possible. Those of ordinary skill in the art will realize that many other measurements, in addition to the bit error rate test and the block error rate test, are possible.

In step 720, a signal indicative of the performance of the upstream channel is output to update the test result. As FIGS. 7A & 7B show, the preferred method loops, testing continuously until it receives a termination signal. By looping and using all errors detected and all bits transmitted, the longer the test runs, the more accurate it will be. In step 708 the method maintains a count of packets transmitted, and in step 718, the method maintains a count of bit errors introduced in the upstream channel. In the alternate method, step 718 maintains a count of packets that the CMTS has discarded. The method loops by returning to step 700.

What is claimed is:

1. A method for determining the performance of a portion of a network, the method comprising:
    transmitting a signal from a transmission point onto the portion of the network;
    receiving the signal at a destination;
    returning the signal to the transmission point;
    correcting errors introduced into the signal in transmission from the destination to the transmission point; and
    determining the performance of the portion of the network from the transmission point to the destination.

2. The method of claim 1 further comprising the step of determining the performance of the portion of the network using the corrected signal.

3. The method of claim 2 wherein the correcting step uses forward error correction techniques.

4. The method of claim 1 wherein the correcting step uses forward error correction techniques.

5. The method of claim 4 wherein the correcting the second errors further comprises:
    determining residual errors in portions of the signal received at the transmission point; and
    discarding the portions of the signal that contain residual errors.

6. The method of claim 4 wherein comparing the signals tests for bit error rate, block error rate, or a combination thereof.

7. The method of claim 1 wherein the method repeats.

8. A method for determining the performance of a portion of a network, the method comprising:
    transmitting a signal from a transmission point onto the portion of the network;
    receiving the signal at a destination;
    detecting errors in the signal received at the destination;
    discarding portions of the signal received at the destination that contain errors;
    returning the non-discarded signal portions to the transmission point;
    determining the magnitude of the discarded portions of the signal from the returned, non-discarded portions;
    using a block error rate test to determine the performance of the portion of the network; and
    determining the performance of the portion of the network from the transmission point to the destination.

9. The method of claim 1 wherein the network is a cable network.

10. The method of claim 9 wherein the destination is a cable modem termination system.

11. The method of claim 1 wherein the portion of the cable network is a local area cable loop.

12. The method of claim 11 wherein the performance of an upstream channel of the local area cable loop is determined.

13. The method of claim 12 wherein the transmitting step transmits the signal in the upstream channel.

14. The method of claim 12 wherein the signal is returned in a forward channel of the local area cable loop.

15. A method for determining the performance of a portion of a network, the method comprising:
    transmitting a test packet from a tester onto an upstream portion of the network;
    receiving the test packet at a cable modem termination system (CMT);
    returning the test packet from the CMTS to the testere on a downstream portion of the Network; and
    using the test packet in the tester to determine the performance of the upstream Portion of the network.

16. The method of claim 15 further comprising:
    transmitting a plurality of test packets from the tester onto the upstream portion of the network; and
    using all of the plurality of test packets to determine the performance of the upstream portion of the network.

17. The method of claim 15 further comprising:
    transmitting a plurality of test packets from the tester onto the upstream portion of the network; and
    discarding test packets with errors by the CMTS.

18. The method of claim 15 wherein the performance is measured as a block error rate.

19. The method of claim 15 wherein the performance is measured as a bit error rate.

20. The method in claim 15 where the performance is measured as a function of discarded packets.

21. The method in claim 15 wherein the network is a cable network.

22. The method in claim 15 wherein:
    the transmitting step transmits the test packet in the upstream channel of a cable network; and
    the returning step returns the test packet in the forward channel of a cable network.

23. The method in claim 15 wherein:
    the transmitting step transmits the test packet in the upstream channel of an Internet network; and
    the returning step returns the test packet in the forward channel of an Internet.

24. The method in claim 15 wherein transmitting the test packet transmits a test packet containing information related to the test packet used by the tester to determine the performance.

25. The method of claim 15 wherein the method repeats.

26. The method in claim 15 wherein:
    transmitting a plurality of test packets from the tester onto the upstream portion of the network; and
    transmitting the plurality of test packets transmits the plurality of test packets containing a pattern that repeats in each of the plurality of test packets.

27. The method in claim 15 wherein:
    transmitting a plurality of test packets from the tester onto the upstream portion of the network; and
    transmitting the plurality of test packets transmits the plurality of test packets with information identifying each of the plurality of test packets as a test packet.

28. The method in claim 15 wherein:
    transmitting a plurality of test packets from the tester onto the upstream portion of the network;
    returning the plurality of test packets from the CMTS to the tester on the downstream portion of the network; and
    ignoring an error in a test packet of the plurality of test packets from the CMTS.

29. The method in claim 15 further comprising transmitting information of the performance to a computer for monitoring the network.

30. The method in claim 15 further comprising monitoring a cable modem using a computer.

31. The method in claim 15 further comprising monitoring performance using a computer.

* * * * *

UNITED STATES PATENT AND TRADEMARK OFFICE
CERTIFICATE OF CORRECTION

| | | |
|---|---|---|
| PATENT NO. | : 7,509,542 B2 | Page 1 of 1 |
| APPLICATION NO. | : 11/164247 | |
| DATED | : March 24, 2009 | |
| INVENTOR(S) | : Jaworski et al. | |

It is certified that error appears in the above-identified patent and that said Letters Patent is hereby corrected as shown below:

Column 1, line 4, insert Section Heading --CROSS-REFERENCE TO RELATED APPLICATIONS--

Column 1, line 7, delete "B1.""" and insert therefor --B1.--

Column 10, claim 15, line 2, delete "(CMT)" and insert therefor --(CMTS)--

Column 10, claim 15, line 3, delete "testere" and insert therefor --tester--

Column 10, claim 15, line 6, delete "Portion" and insert therefor --portion--

Signed and Sealed this

Twelfth Day of May, 2009

JOHN DOLL
*Acting Director of the United States Patent and Trademark Office*